(12) United States Patent  
Gigliotti

(10) Patent No.: US 8,875,096 B1  
(45) Date of Patent: Oct. 28, 2014

(54) DYNAMIC CLASS LOADING

(71) Applicant: Amazon Technologies, Inc., Reno, NV (US)

(72) Inventor: Samuel S. Gigliotti, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 115 days.

(21) Appl. No.: 13/626,639

(22) Filed: Sep. 25, 2012

(51) Int. Cl.  
*G06F 9/44* (2006.01)

(52) U.S. Cl.  
CPC .......................................... *G06F 8/33* (2013.01)  
USPC ............ 717/110; 717/111; 717/174; 717/177

(58) Field of Classification Search  
CPC .......................................................... G06F 8/33  
USPC .................................. 717/110, 111, 174, 177  
See application file for complete search history.

(56) References Cited

U.S. PATENT DOCUMENTS

| | | | |
|---|---|---|---|
| 6,947,148 B2* | 9/2005 | Hill | 356/493 |
| 7,281,242 B2* | 10/2007 | Inamdar | 717/158 |
| 7,962,905 B2* | 6/2011 | Inamdar | 717/158 |
| 2002/0118220 A1* | 8/2002 | Lui et al. | 345/709 |
| 2003/0149960 A1* | 8/2003 | Inamdar | 717/118 |
| 2005/0108692 A1* | 5/2005 | Lau et al. | 717/136 |
| 2006/0089984 A1* | 4/2006 | Chagoly et al. | 709/224 |
| 2008/0005730 A1* | 1/2008 | Inamdar | 717/158 |
| 2011/0010756 A1* | 1/2011 | Choi et al. | 726/2 |

* cited by examiner

*Primary Examiner* — Phillip H Nguyen  
(74) *Attorney, Agent, or Firm* — Novak Druce Connolly Bove + Quigg LLP

(57) ABSTRACT

Approaches are described for loading code on an electronic device by altering the behavior of an application's classloader. The application can be received at an application store, and the application can be injected with code. The application can be downloaded from the application store and installed on the portable computing device or other device, and in response to starting the application, the injected code can be configured to select classes or other application code, and modify a classpath associated with the application to reference the selected classes or application code.

24 Claims, 6 Drawing Sheets

DYNAMIC CLASS LOADING

BACKGROUND

As applications become more complex and include additional features and services, it can be advantageous for an application developer to utilize code created by another application developer to provide some of these features and services. The provided code can be accessed by the application in a number of ways. For example, the provided code can be bundled with the application, and when the application is started, the provided code can be referenced and used as though it were part of the application. However, in the instances where the provided code is updated, the application will also have to be updated. This process can often be tedious and time consuming, and in the situation where the application is distributed through an application store, the application may have to be resubmitted, go through an application approval process, and be updated on each user's device that uses the application.

BRIEF DESCRIPTION OF THE DRAWINGS

Various embodiments in accordance with the present disclosure will be described with reference to the drawings, in which.

DETAILED DESCRIPTION

Figure 1:
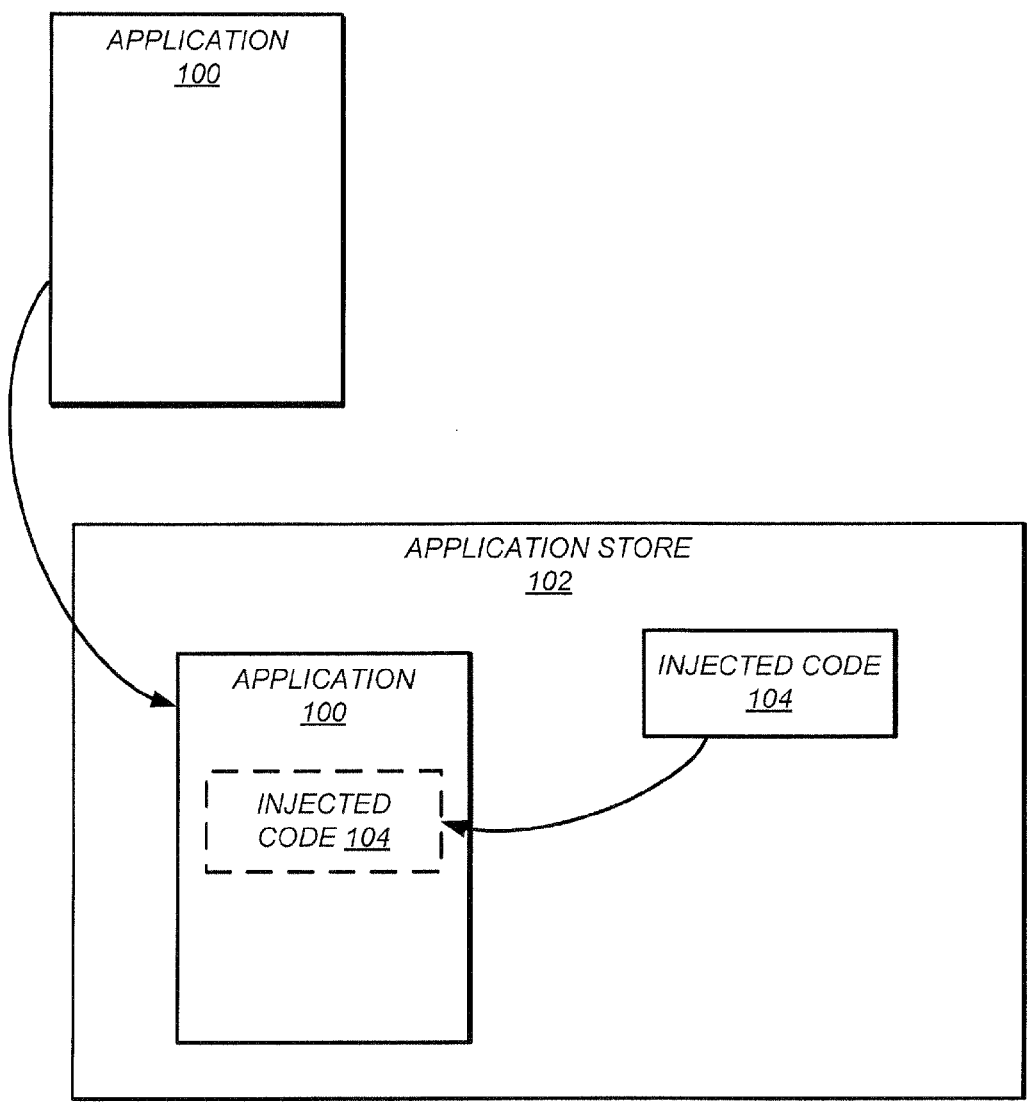
FIG. 1 illustrates an example system for injecting or otherwise providing code to an application, in accordance with an embodiment.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for obtaining, loading, and/or executing code on an electronic device. In particular, various embodiments enable code in an application to be replaced, or supplemented, with other code by altering the behavior of the application's classloader without the application having to be updated.

In accordance with various embodiments, an application (e.g., a restaurant review application or mapping application) can be received at an application store, and the application can be injected with code at an appropriate time, such as before the application is exposed to customers through the application store. The application can be downloaded from the application store and installed on the portable computing device or other device, and can be associated with at least one classpath or other instructions that, when executed by an electronic device (such as a portable computing device), cause the portable computing device to retrieve application code (such as classes or other such code) for use by the application.

For example, in accordance with an embodiment, a portable computing device (or other device) can include a classloader and a classpath. The classloader can be code that when executed, causes the portable computing device to locate classes or other code using the classpath, where the classpath is a set of directories organized in a particular order (e.g., the directories can be organized as a list). For example, when a particular class is needed, the classloader looks in each directory in the order in which the directories are listed in the classpath until the desired class is located.

In response to starting the application, the injected code can be configured to select classes or other application code based at least in part on the application, and can modify the classpath (e.g., by adding a directory entry before the other directory entries) associated with the application to reference the selected classes. Thereafter the application can retrieve the classes referenced by the modified classpath from the added entry.

In accordance with various embodiments, code can be provided, replaced, or supplemented on an application, and can be updated without having to update/reinstall the application. The code can be provided to a third party application developer by another application developer, or any provider of code or services, and can be used to provide a function (such as a map control or other function that a user of the application interacts with) in the application. When the application is received at application store, code can be injected into the application. Thereafter, when a user installs and starts the application on a portable computing device, the injected code can enable the portable computing device to perform tasks such as selecting, based at least in part on the application, the classes (or other code) to be retrieved to provide the functionality of the map controller, modifying the classpath associated with the application to reference the selected classes of the map controller, and retrieving the selected classes using the modified classpath to enable the map controller on the portable computing device.

FIG. 1 illustrates an example system for injecting or otherwise providing code to an application, in accordance with an embodiment. As shown in FIG. 1, an application 100 (e.g., a restaurant review application or a mapping application) is received at an application store 102. The application store in this example can be any digital distribution platform that is intended to provide software to electronic devices. The application can include code provided by a provider, where the code is used in the application to access functionality provided by the provider. For example, the application can be developed by a third party developer, and can utilize code provided by another application developer to provide access to functionality such as a user interface component (e.g., a map control or any other user interface functionality) to a user of the application. The application in this example can also be associated with a classpath when downloaded onto a portable computing device. As described above, a portable computing device (or other device) can include a classloader and a classpath. The classloader can be code that when executed, causes the portable computing device to locate classes or other code using the classpath, where the classpath (in Java and in other programming languages) can be a list of directories where an electronic device (such as a portable computing device) looks for code.

When the application is received at the application store, code 104 (e.g., classpath modifying code) can be injected into the application.

Alternatively, the classpath modifying code 104 can be provided to the third party developer before the application is submitted to the application store, where the third party developer can program the application to call the classpath modifying code when the application is started.

Additionally, in accordance with an embodiment, rather than injecting the classpath modifying code into the application, or providing the classpath modifying code to the third party developer to include in the application, the operating system can be used to alter the classpath associated with the application. For example, the application can include a manifest file that describes, among other things, that the application is using the application code provided by the provider. When the application is started, the operating system can be configured to use the appropriate classpath (modify or add an entry to the classpath) to retrieve that application code provided by the provider.

Optionally, in accordance with various embodiments, the classpath modifying code can be dynamically loaded onto the application. For example, the injected code, in response to the application being started, can be configured to locate the classpath modifying code. Thereafter, the application can execute the classpath modifying code as described above. In this case, the injected code is not modifying the classpath; rather, the injected code is configured to retrieve the classpath modifying, and because the classpath modifying code is separate from the application, the classpath modifying code can be modified without the application having to be updated.

In any of these situations, the injected (or provided) classpath modifying code 104, in response to starting the application, can be configured to identify the application, select one or more classes or other code based at least in part on identifying the application, and modify the classpath associated with the application to reference the selected one or more classes. For example, as described above, the application can include code provided by a provider, and instead of requiring the application to update each time the provider code is updated, the application can dynamically receive updated provider code each time the application is started. For example, the application can be provided with pseudo code (e.g., for testing and compiling the application), and the pseudo code can be replaced with real code when the application is started by altering the application's classpath, so that at run time, the application retrieves the real code using the modified classpath.

Figure 2A:
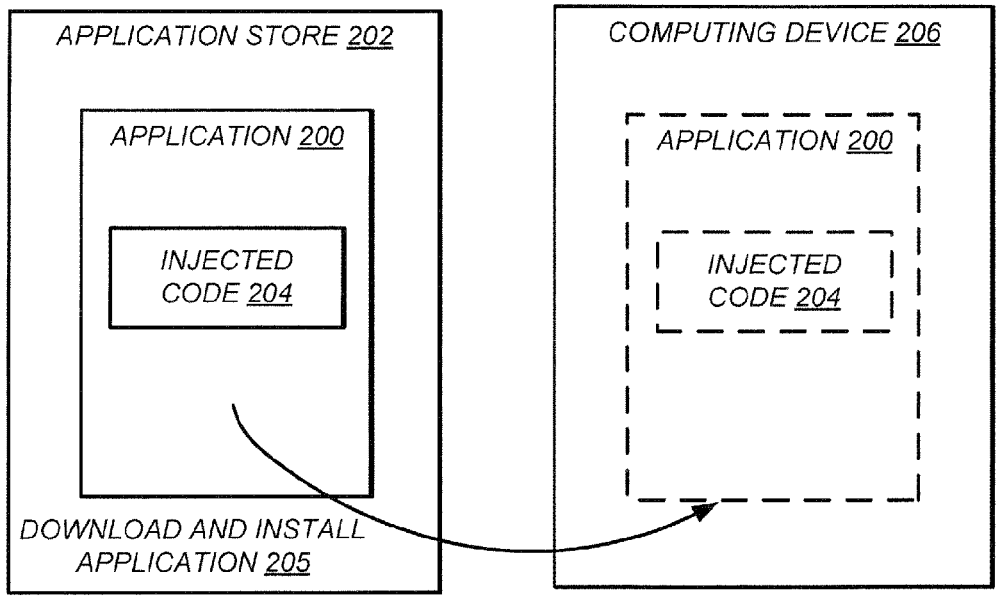
FIGS. 2A-2B illustrates an example system for dynamically loading code on a computing device, in accordance with an embodiment.
Figure 2B:
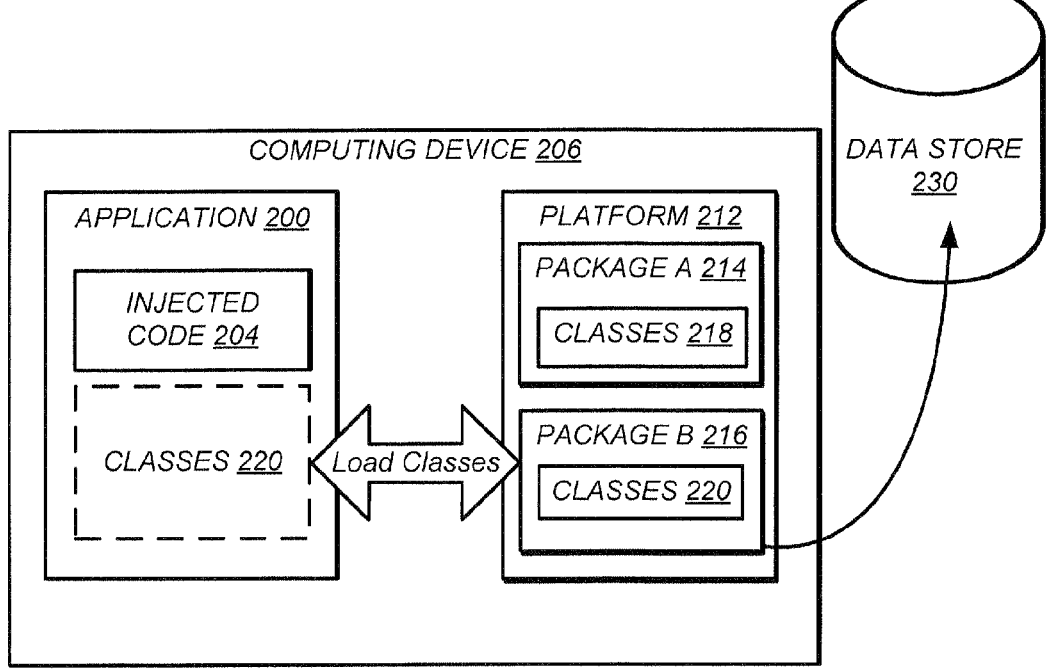

FIGS. 2A-2B illustrate an example system for dynamically loading application code on a computing device for use by an application, in accordance with an embodiment. As shown in FIG. 2A, an application 200 (e.g., a restaurant review application or a mapping application) is downloaded and installed 205 on a portable computing device 206 (e.g., a portable computing device) from an application store 202 or other digital distribution platform, where the application in this example includes injected code 204 (e.g., classpath modifying code).

As described above, the application code (e.g., a map controller) can be provided by a provider for use by the application, and can enable the application to, e.g., display maps or other functionality provided by the provider. The provider may want to update the map controller (or other provided code) without requiring an update by the application, and this can be accomplished at least by altering the application's classpath to allow the application to retrieve the current application code provided by the provider.

For example, in FIG. 2B, the application is started and the injected code is executed. As described above, the injected code 204 can be configured to instruct the portable computing device 206 to perform tasks such as selecting the classes or other program files to be retrieved to provide the provider functionality. In accordance with an embodiment, the classes can be based at least in part on information associated with the application. For example, the classes can depend on an application type (e.g., whether the application is a restaurant review application or a mapping application), the version of the application, and/or other information such as the model of the portable computing device the application is executed on, and user credentials (such as whether the user is an administrator or belongs to a particular group of users). For example, if the application is identified as a restaurant review application, then the classpath associated with the restaurant review application can be modified to direct the application to retrieve code (e.g., map control code) that corresponds with the identified application.

Additionally, the injected code can be configured to modify the classpath associated with the application to reference the selected classes. For example, the classpath can be modified by inserting (or deleting) an entry in the classpath, and/or modifying an existing entry in the classpath. Various alternative methods to modify the classpath can be used within the scope of the embodiments described herein, as will be evident to one of ordinary skill in the art.

The computing device 206 in this example includes an application 200 and a platform 212. Alternatively, in accordance with an embodiment, the platform is not included in the device; rather, the device is in communication with the platform which is stored in a remote location.

The platform can include one or more packages (214, 216) of application code (218, 220) that can include the classes to provide functionality to the third party developer's application. It should be noted that all packages do not have to reside in the platform; rather, packages or other code can be communicated to or otherwise transferred to the platform from a data store or other such device. Alternatively, in accordance with at least one embodiment, the packages in the data store can be communicated directly to the application. As described above, the application code can deliver, e.g., map functionality or any other functionality, where the packages of application code can include classes or other code used to implement the functionality.

When the application is identified, the appropriate package including the classes is selected. For example, as shown in FIG. 2B, based at least in part on application 200, package B including classes B 220 is selected. Thereafter, the classpath associated with the application is modified to reference the selected classes, and the modified classpath is used by the portable computing device to retrieve the selected classes.

In accordance with an embodiment, the application code in package B 216 is separate from the application 200. Thus, in this example, package B 216 can be updated, modified or otherwise altered without requiring an update by the application 200. For example, the platform can be defined as an application, and can be installed on the device 206. When updates are available for any package in the platform, the platform can be updated (separate from the application 200), and the application 200 can be provided with updated code without requiring an update of the application 200.

Additionally, in accordance with an embodiment, multiple versions of package B 216 or other application code can be stored in the platform 212. The various versions can be used with one or more other applications, can be used for beta testing purposes, or any other purpose. Packages can also be added or removed from the platform 212, and these packages can be updated or otherwise modified. For example, a data store 230 remote from the device can include packages or other code that can be added to, and/or otherwise used to modify the packages on platform 212, and the classes on the device can be updated dynamically by enabling the device to obtain classes from the data store and/or platform. In accordance with at least one embodiment, the device can be configured to obtain some of the classes from the platform and the data store, or all the classes from the platform or data store.

Figure 3:
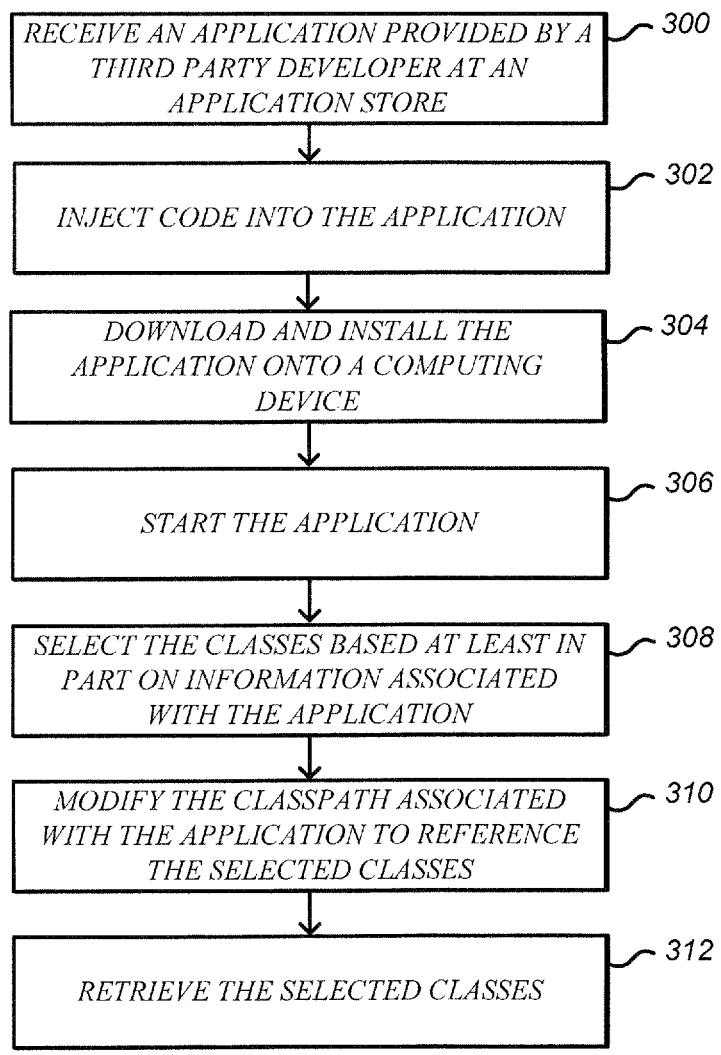
FIG. 3 illustrates an example process for injecting or otherwise providing code to an application, in accordance with an embodiment.

FIG. 3 illustrates an example process for injecting or otherwise providing modifying code to an application, in accordance with various embodiments. It should be understood that, for any process described herein, that there can be additional or fewer steps performed in similar or alternative orders, or in parallel, within the scope of the various embodiments unless otherwise stated. At step 300, an application provided by a third party developer is received at an application store, or other such location or source from which applications can be obtained. The application can in some embodiments include code for a control or code for other functionality that a user of the application interacts with (or code that otherwise aids in the use of the application) such as code for a user interface. For example, the control can be a map control, and can provide map data and other map functionality such as location and directions to a user. The code is provided to the third party developer by a provider, and is maintained by the provider.

At step 302, upon receiving the application at the application store, code (e.g., classpath modifying code) is injected into the application. In accordance with an embodiment, a classpath can be a list of directories where the device (e.g., the mobile phone) that the application is installed on looks when looking for code or other files the application uses. At step 304, the application is downloaded from the application store and is installed on a portable computing device such as a mobile phone. At step 306, the application is started and the injected code is executed. The injected code can be configured to instruct the portable computing device to perform tasks such as selecting, based at least in part on the application, the classes or other code needed to provide the provider functionality, modifying the classpath associated with the application to reference the selected classes, and retrieving the selected classes using the modified classpath.

For example, at step 308, the classes or other code needed to provide the provider functionality are selected based at least in part on information associated with the application. For example, the classes may depend on an application type (e.g., whether the application is a restaurant review application or a mapping application), the version of the application, and/or other information such as the model of the portable computing device the application is executed on and user credentials (such as whether the user is an administrator or belongs to a particular group of users).

At step 310, the classpath associated with the application is modified to reference the selected classes. For example, the classpath can be modified by inserting (or deleting) an entry in the classpath, and/or modifying an existing entry in the classpath. At step 312, the modified classpath is used by the portable computing device to retrieve the selected classes. For example, a platform can include one or more packages of application code that include the classes or other code used to implement the functionality, and the modified classpath can be used by the portable computing device to retrieve the required classes from the appropriate package.

Figure 4:
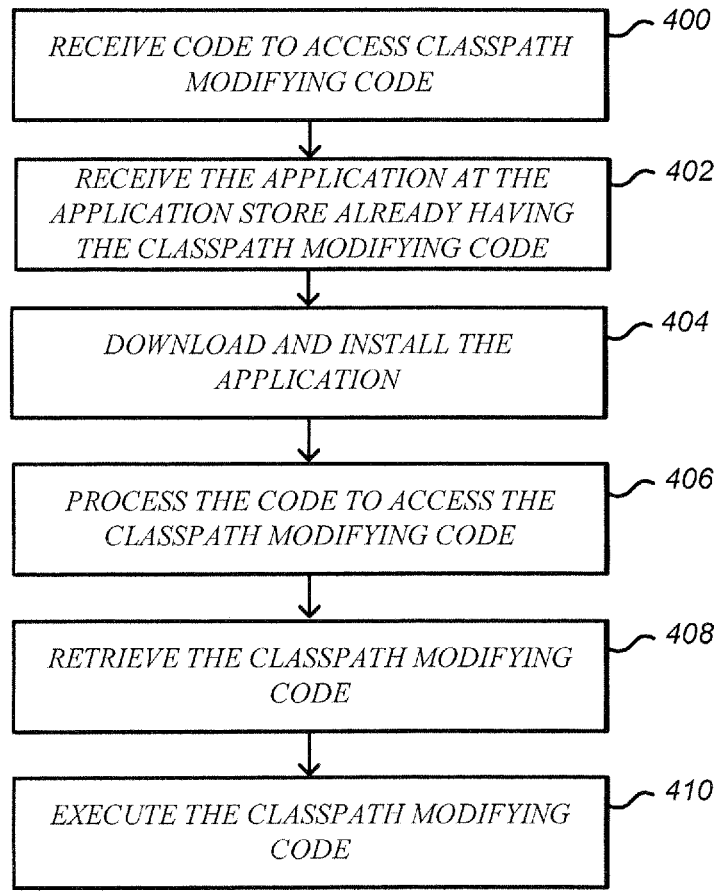
FIG. 4 illustrates an example process for dynamically loading application code on a computing device, in accordance with an embodiment.

FIG. 4 illustrates an example process for dynamically loading application code on a computing device, in accordance with various embodiments. At step 400, code to access classpath modifying code is received by a third party developer before the third party developer's application is submitted to an application store. The third party developer programs the application to call the code to access the classpath modifying code when the application is started. At step 402, the third party developer's application is received at the application store. As described above, the application includes code such as a control or other functionality that a user interacts with, and the code is provided to the third party developer by the provider.

At step 404, the application is downloaded from the application store and is installed on a portable computing device such as a mobile phone. At step 406, the application is started and the code to access the classpath modifying code is executed, and at step 408 the portable computing device retrieves the classpath modifying code. It should be noted that the code to access the classpath modifying code is not modifying the classpath; rather, the code is configured to retrieve the classpath modifying code. In accordance with an embodiment, because the classpath modifying code is separate from the application, the classpath modifying code can be modified without the application having to be updated.

At step 410, the classpath modifying code is executed as described above, where the code is configured to instruct the portable computing device to perform tasks such as selecting, based at least in part on the application, the classes or other code needed to provide the provider functionality, modifying the classpath associated with the application to reference the selected classes, and retrieving the selected classes using the modified classpath.

In accordance with other embodiments, functionality (e.g., map functionality or any other functionality such as an interactive control) provided by a provider can be delivered to a third party application via a platform, where the functionality runs on the platform and the third party application accesses the functionality via a remote view. For example, the third party application can be provided with a remote view of a map or other control a user intends to interact with. A request to interact with a map begins at the third party application and is transferred to the platform. Thereafter, the platform processes the request and responds to the request by updating the remote view for use by the application. It should be noted that although the example described illustrates providing map functionality to a third party device using remote views of the map functionality, various alternative arrangements can be used within the scope of the embodiments described herein, as will be evident to one of ordinary skill in the art.

For example, third party developers can be provided an archive file (e.g., a jar file) that contains proxy implementations of the classes needed to perform the map functionality, and the proxy implementations can be used to load the real implementations from the platform. For example, the platform can include a class "MapControl" that includes a method "DisplayMap". A third party developer's application code can include a proxy implementation of the method DisplayMap. When the proxy implementation is invoked (i.e., DisplayMap), the portable computing device (or other system) can recognize that the real implementation should be loaded, and load the class MapControl from the platform containing the real implementations. Thereafter, the real implementations are executed, and the map can be displayed using the DisplayMap method. It will be evident that the example code provided in Table 1 is provided for purposes of illustration, and that in accordance with other embodiments, other code can used to implement proxy implementations for each method of the real implementation:

TABLE 1

```
public void someMethod(int x) {
    if (realImpl != null) {
        try {
            Method m = realImpl.getClass( ).getMethod("someMethod",
            int.class);
            m.invoke(realImpl, x);
        } catch (Exception e) {
        }
    }
}
```

Figure 5:
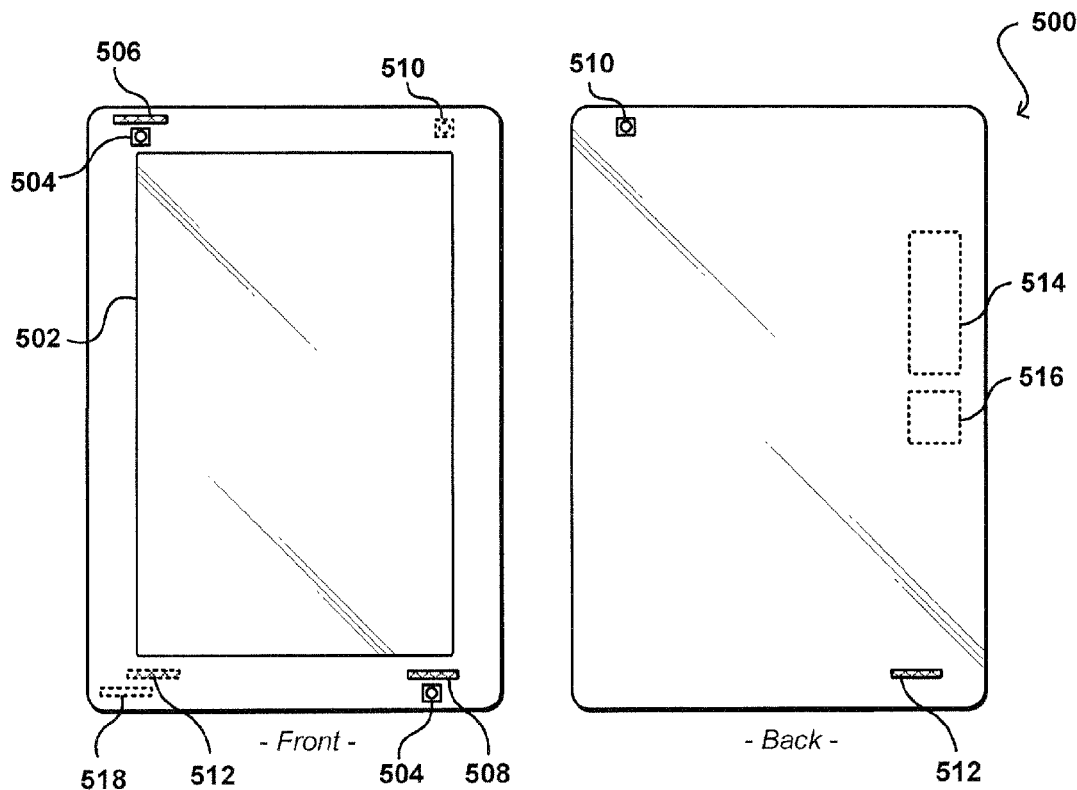
FIG. 5 illustrates front and back views of an example portable computing device that can be used in accordance with various embodiments.

FIG. 5 illustrates front and back views of an example portable computing device 500 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others.

In this example, the portable computing device 500 has a display screen 502 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 510 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 504 on the "front" of the device and one image capture element 510 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 506 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 500 in this example also includes at least one motion or position determining element 508 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 514, such as may include at least one wired or wireless component operable to communicate with one or more portable computing devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
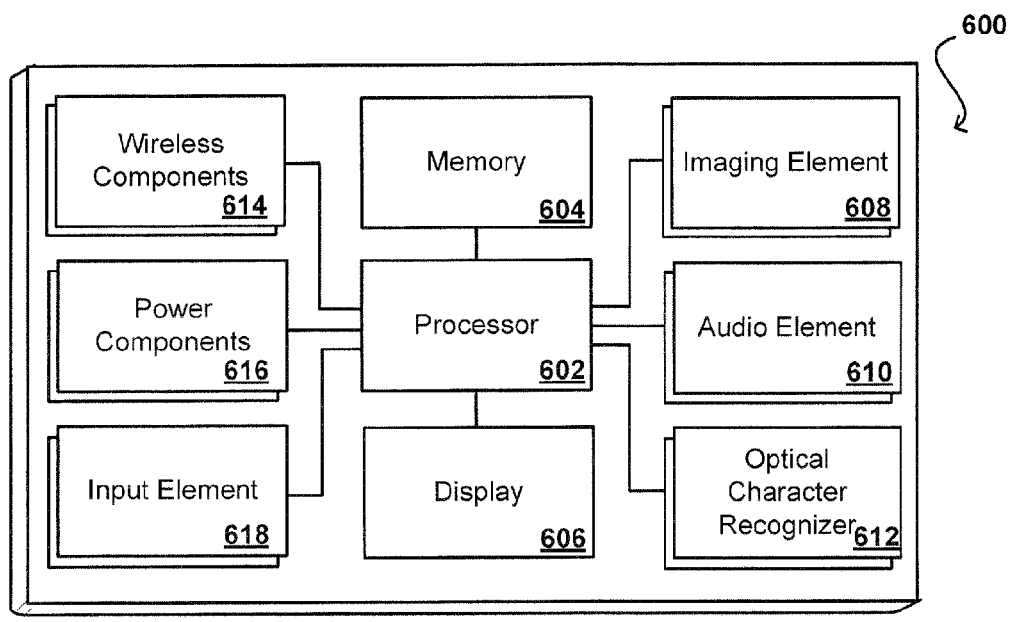
FIG. 6 illustrates an example set of basic components of a portable computing device, such as the device described with respect to FIG. 5.

In order to provide functionality such as that described with respect to FIG. 5, FIG. 6 illustrates an example set of basic components of a portable computing device 600, such as the device 500 described with respect to FIG. 5. In this example, the device includes at least one processor 602 for executing instructions that can be stored in at least one memory device or element 604. As would be apparent to one of ordinary skill in the art, the device can include many types of memory, data storage or computer-readable storage media, such as a first data storage for program instructions for execution by the processor 602, the same or separate storage can be used for images or data, a removable storage memory can be available for sharing information with other devices, etc.

The device typically will include some type of display element 606, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 608, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device, in many embodiments, will include at least one audio element 610, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one optical character recognizer (OCR) element(s) 612 and various image prepossessing algorithms associated therewith.

The device can include at least one additional input device that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 614 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 616 known in the art for providing power to a portable computing device, which can include capacitive charging elements for use with a power pad or similar device as discussed elsewhere herein. The example device also can include at least one touch and/or pressure sensitive element 618, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 7:
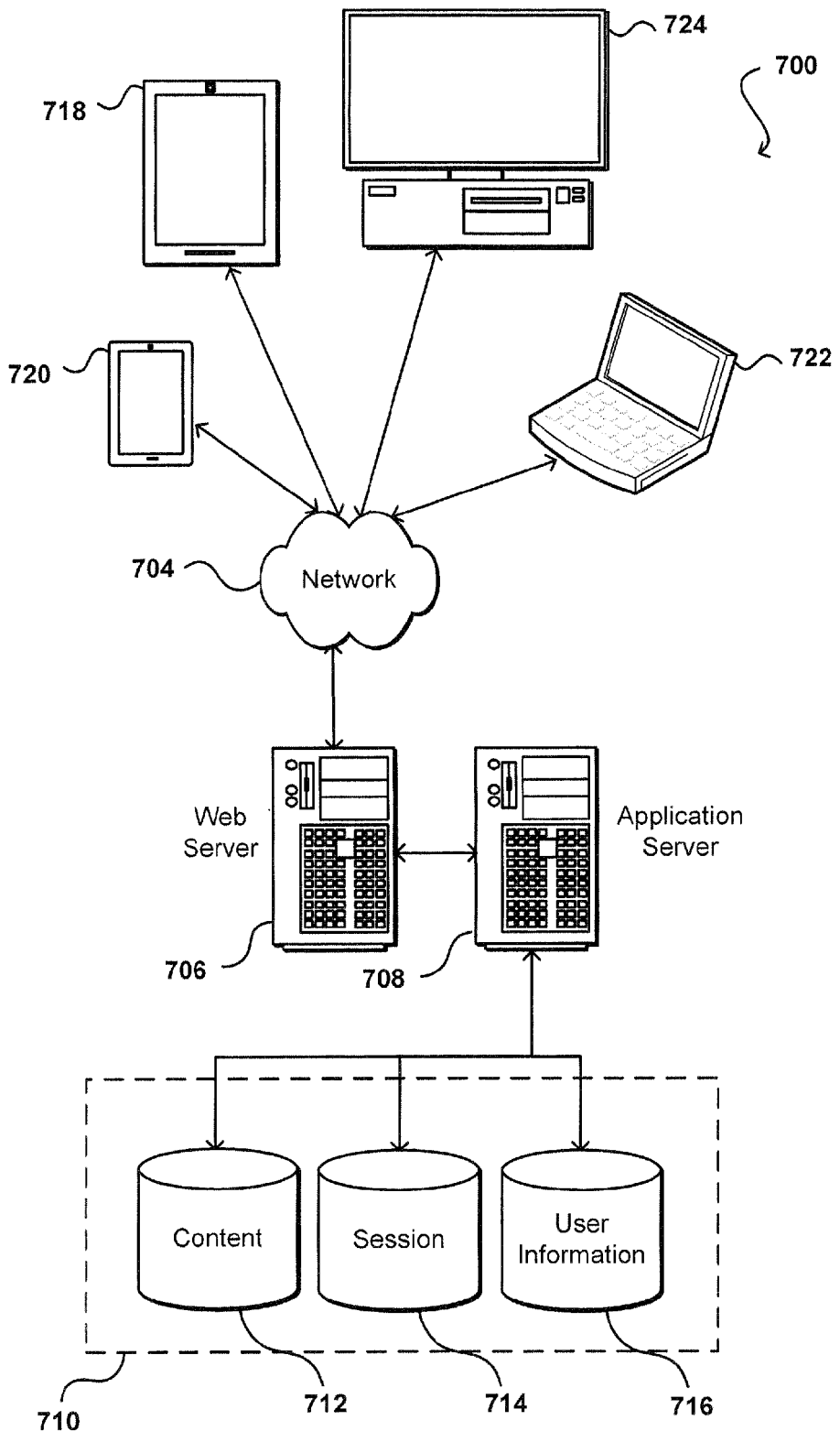
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device (718, 720, 722, 724), which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML, JSON or another appropriate structured language in this example. The handling of all requests and responses, as well as the delivery of content between the client device (718, 720, 722, 724) and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device (718, 720, 722, 724). Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for dynamically loading application code on a computing device, the method comprising:
    under control of one or more computer systems configured with executable instructions,
        receiving an application at a server associated with an electronic application store;
        causing the application to be installed on a computing device in response to receiving a request to install the application from the electronic application store; and
        injecting classpath modifying code into the application, wherein, in response to running the application, the classpath modifying code is configured to:
            identify an application type of the application,
            select one or more classes from a plurality of classes based at least in part on the application type, the one or more classes enabling at least one function of the application, and
            modify a classpath associated with the application to reference the selected one or more classes, the computing device being configured to retrieve the one or more classes to enable the at least one function of the application without requiring an update by the application.

2. The computer implemented method of claim 1, further comprising that in response to starting the application, the classpath modifying code is configured to cause the computing device to retrieve the one or more classes from a platform.

3. The computer implemented method of claim 1, wherein modifying the classpath includes one of adding a directory entry before one or more other directory entries associated with the classpath or modifying an existing one of the one or more other directory entries to reference the selected one or more classes.

4. A computer implemented method, comprising:
under the control of one or more computer systems configured with executable instructions,
receiving an application at an electronic application store;
injecting code into the application, the injected code, when executed by a computing device, causes the computing device to:
retrieve classpath modifying code for the application from a location specified by the injected code; and
modify a classpath associated with the application to reference one or more classes, the computing device being configured to retrieve the one or more classes to enable at least one function of the application without requiring an update by the application.

5. The computer implemented method of claim 4, wherein retrieving the classpath modifying code further includes:
receiving a request for the classpath modifying code from the computing device when in response to running the application;
determining the classpath modifying code based at least in part on the application; and
providing the classpath modifying code to the computing device.

6. The computer implemented method of claim 5, wherein the classpath modifying code is retrieved from one of a location on the computing device, a provider of an application store, a developer of the application, and a third party source.

7. The computer implemented method of claim 5, further comprising:
causing the computing device to retrieve the classpath modifying code from a platform, wherein the platform includes one or more different versions of the classpath modifying code, and wherein the classpath modifying code is configured to be updated without requiring an update of the application.

8. The computer implemented method of claim 4, wherein the injected code, when executed, further causes a processor to:
identify an application type of the application;
select one or more classes from a plurality of classes based at least in part on the application type, the one or more classes providing at least one function; and
modify a classpath associated with the application to reference the one or more classes.

9. The computer implemented method of claim 4, further comprising:
retrieving the classpath modifying code based at least in part on information associated with the application, wherein the information associated with the application is one of an application type of the application or a version number associated with the application.

10. The computer implemented method of claim 4, wherein the classpath modifying code is based at least in part on a run time environment of the application.

11. The computer implemented method of claim 4, further comprising:
specifying the location of the classpath modifying code using a classpath.

12. A computing system, comprising:
at least one processor; and
memory including instructions that, when executed by the processor, cause the computing system to:
receive an application at an electronic market place;
inject code into the application, the injected code, when executed by a computing device, causes the computing device to:
retrieve classpath modifying code at a location specified by the injected code; and
modify a classpath associated with the application to reference one or more classes, the computing device being configured to retrieve the one or more classes to enable at least one function of the application without requiring an update by the application.

13. The computing system of claim 12, wherein the injected code, when executed, further causes the computing device to:
retrieve the classpath modifying code from a platform, wherein the platform includes one or more different versions of the classpath modifying code, and wherein the classpath modifying code is configured to be updated without requiring an update of the application.

14. The computing system of claim 13, wherein the platform is located at a location remote to the computing device.

15. The computing system of claim 12, wherein the computing device, when retrieving the additional classpath modifying code, is further adapted to:
receive a request for the classpath modifying code from the computing device in response to running the application;
determine the classpath modifying code based at least in part on the application; and
retrieve the classpath modifying code.

16. The computing system of claim 12, wherein the injected code, when executed, further causes a processor to identify the application, and in response to the identified application, modify a classpath associated with the application to reference the classpath modifying code.

17. The computing system of claim 12, wherein the computing device is further adapted to:
retrieve the classpath modifying code based at least in part on information associated with the application, wherein the information associated with the application is one of an application type of the application and a version number associated with the application.

18. The computing system of claim 12, wherein the location of the classpath modifying code is specified by a classpath associated with the application.

19. A non-transitory computer readable storage medium storing one or more sequences of instructions executable by one or more processors to perform a set of operations comprising:
providing code for use in an application to an application developer;
receiving the application at a server associated with an electronic application store, the server being accessible by one or more customers of the electronic application store, the application including the code, and the code, when executed by a computing device, causes the computing device to:
identify an application type of the application;

select one or more program files from a plurality of program files based at least in part on the application type, the one or more program files enabling at least one function of the application, and modify a classpath associated with the application to reference the one or more program files, the computing device being configured to retrieve the one or more program files to enable the at least one function of the application without requiring an update by the application.

20. The non-transitory computer readable storage medium of claim 19, further comprising instructions executed by the one or more processors to perform the operations of:

causing the computing device to retrieve the one or more program files from a platform in response to executing the code included in the application.

21. The non-transitory computer readable storage medium of claim 20, wherein the platform includes one or more different versions of the one or more program files, and wherein the one or more program files are updated without requiring an update of the application.

22. The non-transitory computer readable storage medium of claim 19, further comprising instructions executed by the one or more processors to perform the operations of:

receiving a request for the one or more program files from the computing device in response to running the application;

determining the one or more program files based at least in part on the application; and providing the one or more program files to the computing device.

23. The non-transitory computer readable storage medium of claim 19, further comprising instructions executed by the one or more processors to perform the operations of:

retrieving the one or more program files based at least in part on information associated with the application, the information associated with the application being one of an application type of the application or a version number associated with the application.

24. The non-transitory computer readable storage medium of claim 19, further comprising instructions executed by the one or more processors to perform the operations of:

modifying a classpath associated with the application to include a location of the one or more program files, wherein the modified classpath is used to retrieve the one or more program files.

* * * * *